United States Patent [19]
Ohara

[11] 3,978,667
[45] Sept. 7, 1976

[54] HYDRAULIC BRAKE BOOSTER
[75] Inventor: Naoki Ohara, Toyota, Japan
[73] Assignee: Aisin Seiki Kabushiki Kaisha, Toyota, Japan
[22] Filed: Sept. 24, 1975
[21] Appl. No.: 616,368

[30]    Foreign Application Priority Data
   Oct. 31, 1974   Japan.............................. 49-124902

[52] U.S. Cl................................. 60/403; 60/413; 60/547; 60/582
[51] Int. Cl.² ...................... F15B 20/00; F15B 1/02
[58] Field of Search ............ 60/386, 403, 405, 413, 60/547, 548, 582

[56]            References Cited
              UNITED STATES PATENTS
| | | | |
|---|---|---|---|
| 3,638,528 | 2/1972 | Lewis................................... | 60/413 |
| 3,751,912 | 8/1973 | Bach..................................... | 60/405 |
| 3,827,242 | 8/1974 | Belart................................ | 60/582 X |

Primary Examiner—Edgar W. Geoghegan
Attorney, Agent, or Firm—Oblon, Fisher, Spivak, McClelland & Maier

[57]            ABSTRACT

A hydraulic brake booster for use with an open center-type power steering system includes, upon the application of the vehicle brakes, a relief valve piston mechanism for setting the fluid pressure greater than the fluid pressure being previously circulated through the power steering system and a spool valve assembly for selectively admitting the high fluid pressure to a power piston device for the brakes, so that the load upon a pump, under non-application conditions of the brakes, will be reduced whereby it will be easy to accumulate the fluid pressure for the brakes in case of an emergency due to the fact that the fluid pressure set by the relief valve piston can be greater than the pressure required for charging gas within the accumulator.

7 Claims, 2 Drawing Figures

HYDRAULIC BRAKE BOOSTER

BACKGROUND OF THE INVENTION

1. Field of the Invention

The present invention relates generally to a hydraulic brake booster for a vehicle, and more particularly, to a hydraulic brake booster for use with an open center type power steering system.

2. Description of the Prior Art

Conventionally, many hydraulic brake boosters have been proposed. For example, within a brake booster having a pressure difference valve means, the fluid pressure being circulated by a power steering pump must be high enough, under the control of the pressure difference valve means, in order to improve the response of the brake operation when the brakes are to be applied suddenly in an emergency. A circulated fluid pressure which is too high, however, imposes an extra load upon the pump even when the brakes are not applied.

Hydraulic brake boosters having accumulators to accumulate the fluid pressure for the brakes in case of an emergency are also conventionally arranged such that the fluid pressure which is generated upon the operation of the brake booster or the power steering gear can be accumulated within the accumulators. It is noted here however, that the conventional accumulators have been of the gas and spring type, and the fluid pressure generated upon the operation of the booster or the power steering gear must overcome the pressure for charging the gas within the accumulators of the gas type or the setting pressure of the spring within the accumulators of the spring type in order to in fact be accumulated within the accumulators.

Yet, sometimes the fluid pressure generated upon the operation of the booster or the power steering gear has not been high enough. In other words the generated fluid pressure has been less than the pressure required for charging the gas or for setting the pressure of the spring, and thus, the operations of the accumulation often have been incomplete.

SUMMARY OF THE INVENTION

Accordingly, it is an object of the present invention to provide a brake booster which obviates the various conventional drawbacks noted hereinabove.

A further object of the present invention is to provide a brake booster which has a good response with respect to the brake operation.

A still further object of the present invention is to provide a brake booster system within which the accumulator of the fluid pressure for the brakes in case of emergency can easily and surely be made and the extra load upon the power steering pump will be reduced when the operation of the brakes is not desired.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF A PREFERRED EMBODIMENT

Figure 1:
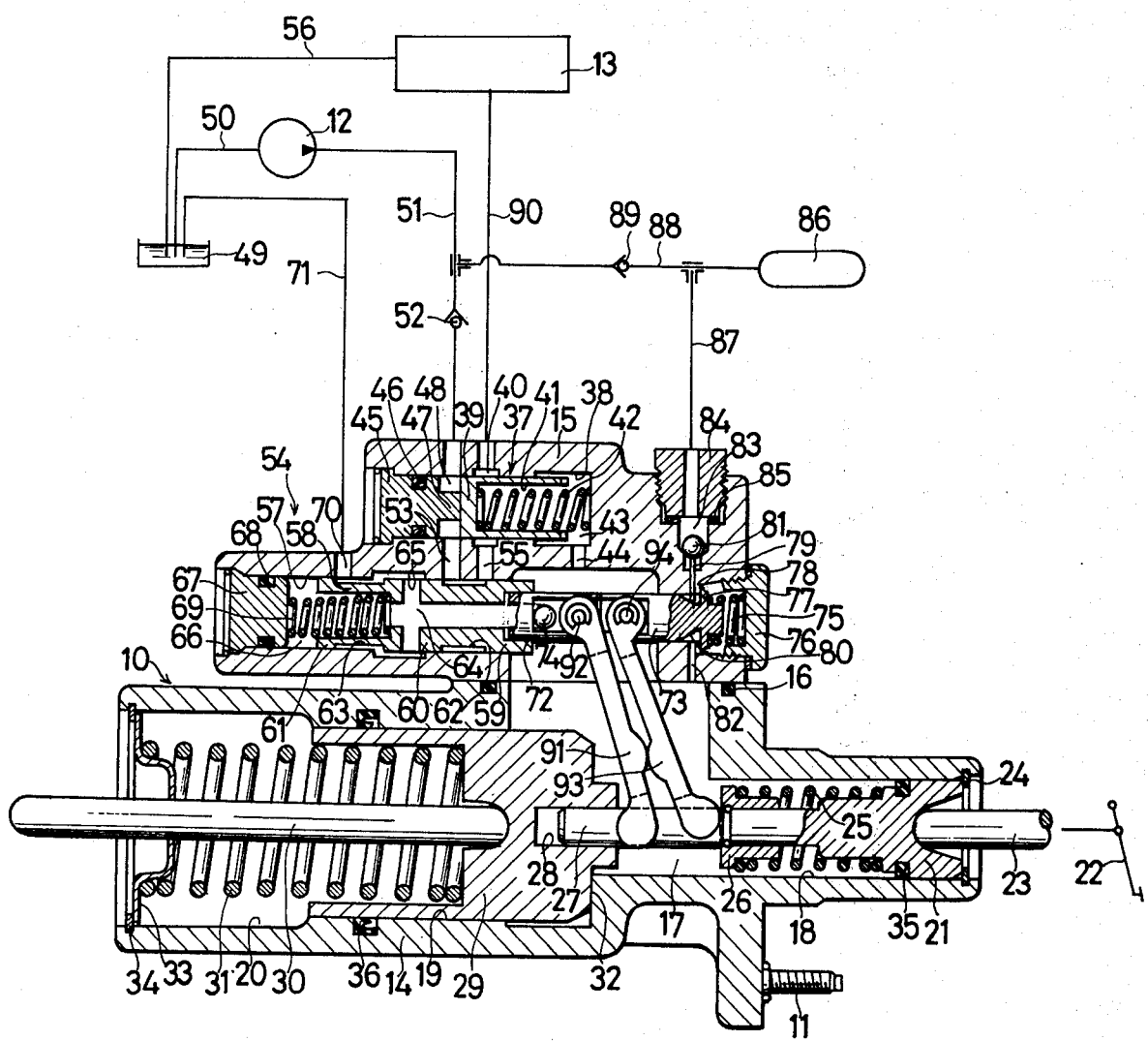
FIG. 1 is a cross-sectional view of a hydraulic booster for use with a power steering system, constructed in accordance with the present invention and showing its cooperative parts.

Referring now to the drawings, and more particularly to FIG. 1 thereof, a hydraulic booster, generally indicated by the reference character 10, for a master cylinder, is installed within a vehicle by suitable fastener means 11 between a power steering pump 12 and a power steering gear 13 and the booster 10 includes lower and upper housing sections 14 and 15, respectively, which are secured to each other in a fluid tight relationship therebetween by means of an O-ring seal 16 whereby a control chamber 17 is defined between and within the housings 14 and 15.

The housing 14 is provided with a stepped bore which includes a small bore 18, an intermediate bore 19, and a large bore 20, the small bore 18 slidably receiving an input piston 21 which is operatively connected to a brake pedal 22 by means of a push rod 23. The piston 21 is normally in the illustrated position in which the right end of the piston 21 is in contact with a ring 24 under the influence of a biasing force of a spring 25 interposed between a shoulder of the piston 21 and an abutment 26 mounted upon the piston 21, the movement of the brake pedal 22 nevertheless being effective to move the input piston 21 against the biasing force of the spring 25. The left end 27 of the input piston 21 extends into a blind recess 28 of a power piston 29 which is connected through means of a push rod 30 to the master cylinder which, in turn, supplies brake pressure fluid to the wheel cylinders of the vehicle in a conventional manner. A spring 31, disposed within housing 14, biases the power piston 29 toward the right so that the power piston 29, slidable within the intermediate bore 19, has its right end portion in contact with a shoulder 32 of the housing 14 under normal conditions, while the other end of the spring 31 is engaged with a retainer 33 which is secured within housing 14 by means of a ring 34. Seals 35 and 36 serve to maintain the chamber 17 in fluid tight condition.

A relief piston assembly or a pressure difference responsive means, generally indicated by the reference character 37, is disposed within a stepped bore 38 defined within the housing section 15 and includes a piston 39 slidably supported within the bore 38 so as to thereby control an outlet port 40. The piston 39 has a bore 41 defined therein which contains a spring 42 having one end seated against the closed end of the bore 41 while the other end thereof is seated against the wall of the housing section 15, the bore 41 and the inner wall of the housing section 15 therefore defining a chamber 43 which fluidically communicates with the control chamber 17 through means of a radial passage 44 defined within the housing section 15. Normally, the left end of the piston 39 is in contact with a plug 45, under the influence of spring 42, which is inserted within the bore 38 of the housing section 15, and is sealed relative thereto by means of seal 46, the plug 45 having a reduced right end portion 47 for forming an inlet port 48 within or relative to the housing section 15.

The inlet port 48 receives hydraulic fluid from the pump 12 which is connected to a reservoir 49 through means of a conduit 50 and which continuously circulates the hydraulic fluid through means of a conduit 51 having a check valve 52 disposed therein. Hydraulic fluid transmitted to the inlet port 48 can be directly transmitted to the outlet port 40 upon movement of the piston 39 toward the right, which movement depends upon the operations of the brake booster 10 and the power steering gear 13, as will become more apparent hereinafter, however normally, the fluid within the inlet port 48 is circulated to the outlet port 40 through means of a radial passage 53 provided within the housing section 15, a spool valve assembly, generally indicated by the reference character 54, and another radial passage 55 also provided within housing section 15. Hydraulic fluid normally circulated to the outlet port 40 is then transmitted to the power steering gear 13 by means of a conduit 90 and is subsequently returned to the reservoir 49 by means of conduit 56.

The spool valve assembly 54 is disposed within a stepped bore 57 of the housing section 15 and has a spool valve 58 slidably disposed therein. The spool valve 58 is provided with first, second and third lands 59, 60 and 61, respectively, and first and second grooves 62 and 63, respectively, alternately defined therebetween. The first groove 62 always communicates with the passage 53 and is adapted to communicate with the passage 55 so as to thereby form a fluid circulating passage between the power steering pump 12 and the power steering gear 13, while the first land 59 is adapted to close the passage 55 so that the first land 59 and the inner wall of the bore 57 form a valve portion. The spool valve 58 per se is provided with a passage 64 which is open to a groove 65 defined within the housing section 15 and the passage 64 is fluidically connected to the control chamber 17 as well as to a chamber 66 provided between the spool valve 58 and a plug 67, chamber 66 being sealed by means of the plug 67, and an O-ring seal 68 disposed therein.

The second land 60 is adapted to engage the inner wall of the housing section 15, however, fluid communication between the passages 53 and 64 is permitted through groove 62 when the spool valve 58 is moved toward the left. Thus, the land 60 and the inner wall of the housing section 15 form an inlet valve portion for the booster brake operation to convey hydraulic fluid from the pump 12 to the control chamber 17. A spring 69 interposed between the spool valve 58 and the plug 67 biases the spool valve 58 toward the right so that under normal conditions, the passage 64 is fluidically connected to a drain port 70 formed within the housing section 15, through means of grooves 65 and 63, the fluid then being conducted to reservoir 49 through means of a conduit 71. The left end of the second land 60 of the spool valve 58 is thus adapted to terminate the fluidic communication between grooves 65 and 63, and more particularly, the communication between the passage 64 and the drain port 70, when the spool valve 58 is moved toward the left.

A first cylindrical member 72 is rigidly connected to the right end of the spool valve 58 and a second cylindrical member 73 is slidably disposed within the bore 57 of the housing section 15, the first cylindrical member 72 being provided with a passage 74 which provides the fluidic communication between the passage 64 and the control chamber 17. A spring 75, having one end seated against a shoulder portion 77 of the member 73 and its opposite end seated against a plug 76 which is threaded within the housing section 15, biases the member 73 in the left direction as viewed in FIG. 1, the biasing force of the spring 75 being sufficiently greater than that of the spring 69 so that the cylindrical members 72 and 73 are normally at the illustrated positions wherein shoulder 77 of the second member 73 is in contact with a stepped inner wall 78 of the housing section 15.

In these positions, a plunger 79, which extends through the housing section 15, is engaged with the lower portion of an inclined surface 80 of the cylindrical member 73 and consequently, a ball 81 prevents fluid communication from an outlet port 83 to a radial passage 82 leading to the control chamber 17, the outlet port 83 being sealed by means of a plug 84 which is provided with an O-ring seal 85. The movement of the cylindrical member 73 toward the right pushes the plunger 79 upwardly, through means of the contact therewith by the inclined surface 80, and thus, the ball 81 is likewise raised. This results in the establishment of communication between the control chamber 17 and the outlet port 83, the latter of which is connected to an accumulator 86 through means of conduits 87 and 88, line 88 having a check valve 89 disposed therein and interposed between conduit 51 and accumulator 86. The accumulator 86 may be of the gas type within which the fluid pressure can be accumulated so as to overcome the charging pressure for the gas charged within the accumulator, or otherwise, the accumulator 86 may be of the spring type within which the fluid pressure can be accumulated so as to overcome the setting force of the spring provided therewithin.

A first lever 91 has a bifurcated upper end pivoted upon the cylindrical member 72 through means of a pin 92 while its opposite bifurcated lower end is straddled over the end 27 of the input piston 21, and a second lever 93 has substantially the same configuration as that of the first lever 91, however, lever 93 is pivoted upon the second cylindrical member 73 by means of a pin 94, both of the levers 91 and 93 being provided with convex portions at their intermediate portions, respectively. The levers 91 and 92 are disposed in a similar manner and, consequently, the intermediate convex portions of the levers are in contact with each other, the lower end of the lever 91 being in contact with the right end of the power piston 29 so as to be limited from rotating beyond the position thereof, and the lower end of the lever 93 is similarly in contact with the abutment 26 so as to likewise be limited from rotating beyond the position thereof. Thus, the levers 91 and 93 serve to transmit the relative displacement between the input and power pistons 21 and 29 to the cylindrical members 72 and 73.

In operation, under normal operating conditions with the power brake booster 10 in the brake released condition, and with the power steering gear 13 in the no steering condition, the component parts of the brake booster mechanism occupy their respective positions as shown within FIG. 1. Accordingly, the hydraulic fluid from pump 12 circulates to the booster mechanism 10, through means of the passages 51, 48, 53, 62, 55 and 40, and then to the power steering gear 13 through the conduit 90, the same being subsequently returned to the reservoir 49 through means of line 56.

When the brake application is made under the condition within which no power steering correction is performed, the depression force upon the brake pedal 22 causes movement of the push rod 23 and the input piston 21 toward the left. In this condition, the abutment 26 follows the movement of the input piston 21 due to the biasing force of the spring 25, however, the lower end of the lever 91 is prevented from undergoing such movement due to the presence of power piston 29 which remains in its illustrated position due to the biasing force of the spring 31, and consequently, the cylindrical member 73 is maintained within its illustrated position due to the biasing force of the spring 75. Therefore, the upper end of lever 91 is moved toward the left as a result of the contact between the intermediate convex portions of levers 91 and 93 as a result of the lever 93 being urged toward the left in response to the movement of the abutment 26. This action results in the leftward movement of the spool valve 58 so as to terminate the hydraulic communication between the passages 53 and 55, or in other words, between the inlet port 48 and the outlet port 40, and in addition, the hydraulic communication betwen passages 64 and 70, and more particularly, the control chamber 17 and the reservoir 49, is likewise terminated.

Figure 2:
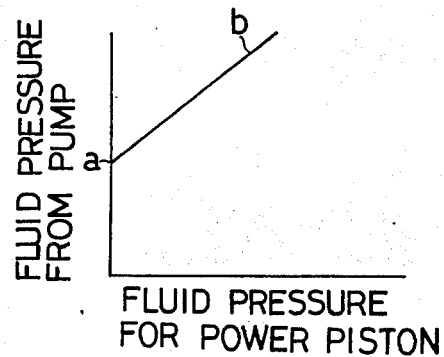
FIG. 2 is a diagram showing the relation between the fluid pressure delivered from a power steering pump and the fluid pressure exerted upon a power piston means for the brakes.

The pressure of the hydraulic fluid within the inlet port 48 is therefore immediately increased to the order of approximately 15 Kg/cm$^2$, which is shown by "$a$" in FIG. 2, and this increased fluid pressure urges the piston 39 toward the right against the biasing force of spring 42 thereby establishing hydraulic communication between the inlet port 48 and the outlet port 40. Continued movement of the spool valve 58 establishes the communication between inlet port 48 and the passage 64, and subsequently the increased fluid pressure is transmitted to the control chamber 17 through means of the passage 74. The fluid pressure now urges the power piston 29 toward the left in FIG. 1 so as to energize the master cylinder for the brakes through means of the push rod 30.

The fluid pressure is also conveyed to the chamber 43, through means of the passage 44, so as to urge the piston 39 of the relief valve piston assembly 37 in the direction wherein the inlet port 48 is closed with respect to the fluid flow from the outlet port 40, and consequently, the fluid pressure at the inlet port 48 will be increased. This means that there will be a similar increase in the fluid pressure within the control chamber 17, as shown by line a - b in FIG. 2, and thus, the pressure for the brakes will be correspondingly increased.

During the aforenoted brake operation, when the fluid pressure within the control chamber 17 overcomes the depression pressure upon the brake pedal, the input piston 21 is returned back toward the right whereby the spool valve 58 is returned so as to close the passage 64 with respect to the inlet port 48 and to open the passage 64 with respect to the drain port 70. Accordingly, the pressure of the fluid within the control chamber 17 will be reduced, and the on-off control of the passage 64 will thereafter be repeated so that the braking operation desired by the operator will be completed.

When the fluid pressure within the control chamber 17 exceeds the predetermined value, such as for example, the pressure for charging the gas within the accumulator or the setting pressure of the spring within the accumulator, the fluid pressure within the control chamber 17 can be accumulated within the accumulator 86 through means of the passage 82, that is, the passage accommodating the plunger 79 and the port 83.

When the power steering correction is being made, however no brake application is being performed, the power steering pump 12 delivers a higher fluid pressure due to the demand of the operation of the power steering gear and when this fluid pressure which is delivered by means of pump 12 to the power steering gear 13 exceeds the predetermined value, namely, 15 Kg/cm$^2$, the piston 39 is moved toward the right. Thereafter, the fluid pressure is also coveyed to the power steering gear 13 as a result of the direct communication between the inlet and outlet ports 48 and 40, respectively. All parts of the spool valve assembly 54 thus remain in their original positions and no braking operation is performed.

When both the braking operation and the power steering corrections are being performed, the increased fluid pressure is conveyed to the control chamber 17 for the brakes under the control of the relief valve piston assembly 37 and the spool valve assembly 54, as will be apparent from the discussion hereinbefore, and the demanded fluid pressure is also conveyed to the power steering gear 13 under the operation of the relief piston assembly 37, as will also be apparent from the description hereinbefore. Assuming that, at first, the power steering gear 13 is operated and then the braking application is performed, the fluid pressure, which is greater than the pressure the driver desires, may be introduced into the control chamber 17. Under this condition, the high fluid pressure within the control chamber 17 urges the input piston 21 toward the right against the depression force upon the brake pedal 22, and thus the spool valve 58 is returned toward the right, through means of the lever 91, in order to terminate the communication between passage 64 and the groove 62 and to open the passage 64 to the drain port 70. This operation is repeated and the fluid pressure desired by the driver is introduced into the control chamber 17.

It should be noted that the braking operation can be performed even when the power steering pump 12 fails to operate. Under the emergency condition, the spool valve 58 is moved toward the left through means of the push rod 23, the input piston 21, the lever 91, and the member 72, until the spool valve 58 is in contact with and the movement thereof limited by the plug 67. Further depression upon the brake pedal 22 causes force to be exerted upon the lever 93 through means of the abutment 26 due to the fact that the movement of the lever 91 is now limited by means of the spool valve 58 and the power piston 29. Accordingly, the movement of the lever 93 causes the member 73 to move toward the right as a result of the contact between levers 91 and 93 at their intermediate portions, and as a result, the surface 80 of the member 73 pushes the plunger 79 outwardly whereby the ball 81 is in turn driven outwardly so that the fluid pressure accumulated within accumulator 86 is introduced into the control chamber 17 for the brakes.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hydraulic brake booster having a source of continuously circulating fluid pressure comprising:
   a housing having an inlet port and an outlet port;
   input piston means slidable within said housing and operatively connected to a brake pedal;
   power piston means slidable within said housing so as to energize a master cylinder for the brakes;
   a control chamber interposed between said input and power piston means;
   a spool valve assembly slidable within said housing for selectively admitting fluid pressure from said inlet port to said control chamber so as to thereby actuate said power piston means;
   a connecting means for transmitting the movement of said input piston means to said spool valve assembly; and
   a pressure difference responsive means slidable within said housing and movable between a first position in which fluid pressure from said source to said inlet port is circulated to said outlet port through a passage means formed within said pressure difference responsive means, and with respect to said spool valve assembly, and a second position in which the fluid pressure is set greater than the previous fluid pressure from said source after said passage means is blocked by the initial movement of said spool valve assembly,
   whereby said greater fluid pressure is transmitted to said control chamber as a result of further movement of said spool valve assembly.

2. A hydraulic brake booster as set forth in claim 1, wherein said pressure difference responsive means comprises:
   a slidable piston having one end exposed to the fluid pressure at said inlet port and its opposite end hydraulically connected to said control chamber so as to be exposed to the fluid pressure at said control chamber and being urged, by a biasing means, against the fluid pressure at said inlet port.

3. A hydraulic brake booster as set forth in claim 2, wherein:
   said piston of said pressure difference responsive means is a relief valve piston for communicating said inlet port to said outlet port through another passage after said passage means is blocked by said initial movement of said spool valve assembly.

4. A hydraulic brake booster as set forth in claim 3, wherein said spool valve assembly comprises:
   a first valve portion for controlling said passage means, providing communication between said inlet and outlet ports, by the initial movement thereof; and
   a second valve portion for controlling the fluid pressure from said inlet port to said control chamber by further movement of said spool valve assembly.

5. A hydraulic brake booster having a source of continuously circulating fluid pressure and an accumulator means for accumulating emergency fluid pressure comprising:
   a housing having an inlet port and an outlet port;
   an input piston means slidably within said housing and operatively connected to a brake pedal;
   a power piston means slidable within said housing to energize a master cylinder for the brakes;
   a control chamber interposed between said input and power piston means;
   a passage means for connecting said control chamber and said accumulator means and having a check valve means disposed herein;
   a spool valve assembly slidable within said housing for selectively admitting fluid pressure from said inlet port to said control chamber so as to thereby actuate said power piston means;
   a control member for controling the fluid flow from said accumulator means to said control chamber;
   a first connecting means for transmitting the movement of said input piston means to said spool valve assembly;
   a second connecting means for transmitting the movement of said input piston means to said control member; and
   a pressure difference responsive means slidable within said housing and movable between a first position in which fluid pressure from said source to said inlet port is circulated to said outlet port through a passage formed within said pressure difference responsive means and with respect to said spool valve assembly, and a second position in which the fluid pressure is set greater than the previous fluid pressure from said source after said passage is blocked by the initial movement of said spool valve assembly,
   whereby the higher fluid pressure is transmitted to said control chamber as a result of further movement of said spool valve assembly.

6. A hydraulic brake booster set forth in claim 5, wherein said spool valve assembly comprises:
   a first biasing means which urges said spool valve assembly against said first connecting means; and
   said control member comprises a second biasing means which urges said control member against said second connecting means,
   the biasing force of said first biasing means being smaller than that of said second biasing means.

7. A hydraulic brake booster system having a source of continuously circulating fluid pressure, a power steering gear for receiving fluid pressure from said source and an accumulator means for accumulating emergency fluid pressure comprising:
   a housing having inlet and outlet ports, said inlet port being hydraulically connected to said source and said outlet port being hydraulically connected to said power steering gear;
   an input piston means slidable within said housing and operatively connected to a brake pedal;
   a power piston means slidable within said housing so as to energize a master cylinder for the brakes;
   a control chamber interposed between said input and power piston means;
   a spool valve assembly slidable within said housing for selectively admitting fluid pressure from said inlet port to said control chamber so as to thereby actuate said power piston means;
   a connecting means for transmitting the movement of said input piston means to said spool valve assembly; and
   a pressure difference responsive means slidable within said housing and movable between a first position in which fluid pressure from said source to said inlet port is circulated to said outlet port through a passage means formed within said pressure difference responsive means and with respect to said spool valve assembly, and a second position in which the fluid pressure is set greater than the previous fluid pressure from said source after said passage means is blocked by the initial movement of said spool valve assembly,
   whereby the higher fluid pressure is transmitted to said control chamber as a result of further movement of said spool valve assembly.

* * * * *